(No Model.)

P. MURPHY.
CLOSED CONDUIT FOR ELECTRIC RAILWAYS.

No. 535,294. Patented Mar. 5, 1895.

Witnesses.
Inventor.
Patrick Murphy
by Barton & Brown Atty's.

UNITED STATES PATENT OFFICE.

PATRICK MURPHY, OF CHICAGO, ILLINOIS.

CLOSED CONDUIT FOR ELECTRIC RAILWAYS.

SPECIFICATION forming part of Letters Patent No. 535,294, dated March 5, 1895.

Application filed January 9, 1894. Serial No. 496,280. (No model.)

*To all whom it may concern:*

Be it known that I, PATRICK MURPHY, a citizen of the United States, residing at Chicago, in the county of Cook and State of Illinois, have invented a certain new and useful Improvement in Conduit Systems for Electric Railways, (Case No. 1,) of which the following is a full, clear, concise, and exact description, reference being had to the accompanying drawings, forming a part of this specification.

My invention relates to conduit systems for electric railways, and its object is to afford effectual protection to the trolley wire in such a system from water or other objectionable substances that may enter the conduit, and further, to render more efficient the operation of conduit systems.

My invention broadly considered comprises an ordinary conduit provided with a slot opening into the surface track, said conduit containing a normally closed conduit within which is located the trolley wire, said interior conduit being adapted to be opened as the car passes to permit the access of the trolley wheel to the trolley wire, the same being again closed upon the passage of the car. In its preferred form, the internal conduit comprises a pair of hinged members which overlap at their upper ends, means being provided for separating the overlapping ends to permit the passage of the arm carrying the trolley. This means may comprise a track, one rail of which is supported upon each of the hinged members and so located relatively to the pivotal axes that the pressure thereon of a pair of rollers or other traveling parts carried upon the car, will cause a rocking of the hinged members to an extent sufficient to open the slot.

I will describe my invention more in detail in connection with the accompanying drawings, in which—

Figure 1:
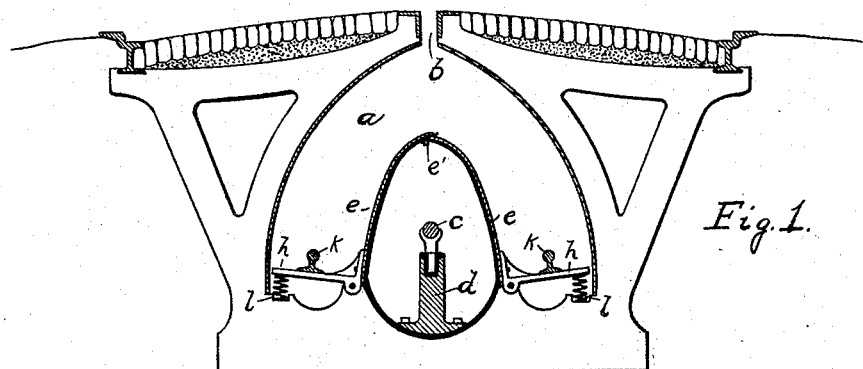
Figure 2:
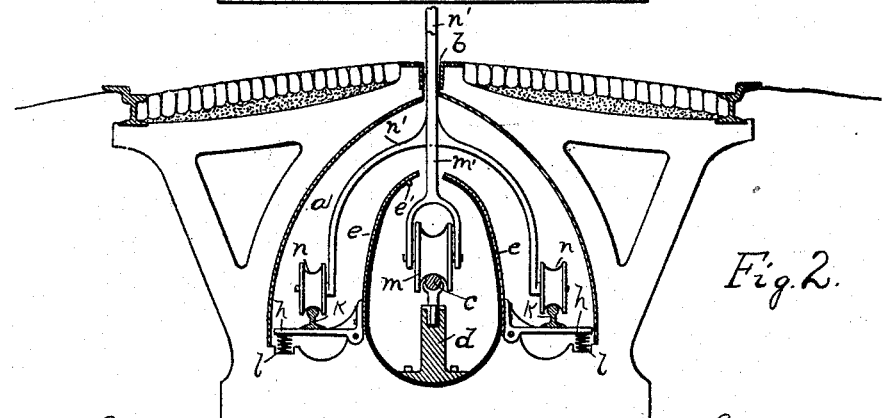
Figure 3:
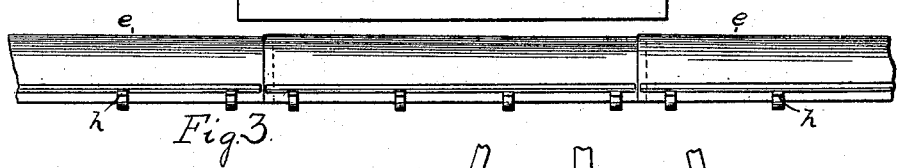
Figure 4:
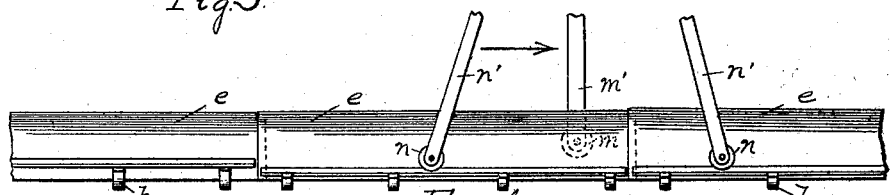
Figure 5:
Figure 6:
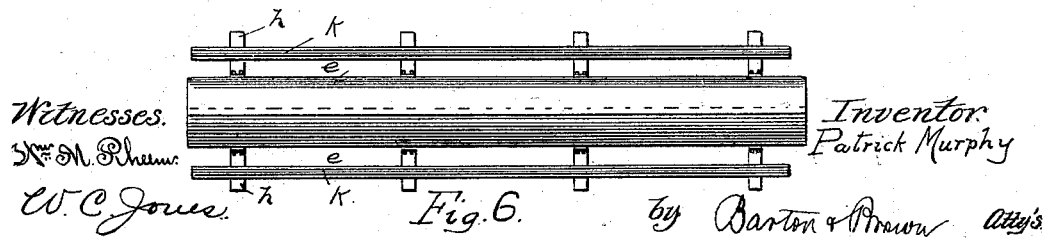

Figure 1 is a sectional view showing the interior conduit closed. Fig. 2 is a similar view showing the interior conduit opened to permit the passage of the trolley support. Fig. 3 is a side view of the interior conduit removed from the exterior conduit. Fig. 4 is a similar view showing the relative locations of the trolley wheel and the conduit opening wheels. Fig. 5 is a top view of the interior conduit showing the same opened for the passage of the trolley support. Fig. 6 is a similar view showing the conduit closed.

Like letters refer to like parts throughout the several figures.

The exterior conduit $a$ may comprise the usual arch-shaped conduit provided with a slot $b$ opening upon the road bed, and through which the arm carrying the trolley wheel may pass. Occupying a position beneath the slot and properly insulated the trolley wire $c$ is carried upon suitable supports $d\,d$. Located upon either side of the trolley wire, and rotatably mounted are the hinged members $e\,e$, whose upper ends overlap to form a closed tube within which lies the trolley wire. To said hinged members are secured arms $h\,h$ supporting rails $k\,k$.

The hinged members $e\,e$ are resiliently maintained closed by springs $l\,l$ placed beneath the arms $h\,h$, or by other suitable arrangement. To limit the movement of the overlapping ends of the hinged members stops $e'\,e'$ may be provided, against which the end of one of the members may rest. The interior surface of the conduit thus formed is preferably lined with an insulating and moisture proof substance to prevent entrance of moisture to the conduit.

The trolley wheel $m$ is carried upon an arm or support $m'$ which extends through the slot $b$ and between the ends of the hinged members when their overlapping ends are separated. To secure the separation of said ends, wheels or rollers $n\,n$ are provided mounted upon the ends of a fork-shaped arm $n'$ extending through the slot $b$, the wheels $n\,n$ being so located that they will bear upon the rails $k\,k$ and in passing over them depress the arms $h\,h$, thus rocking the hinged members $e\,e$ upon their pivots to open the interior conduit. When the car has passed, the springs act to close the interior conduit. Two pairs of wheels $n\,n$ are provided, one located in advance of the trolley wheel and one to the rear.

If the hinged members be made of sufficiently flexible material they may be made continuous, the flexibility of the material permitting the opening of the slot at the location of the car, while maintaining the slot closed in advance of and to the rear of the car. I prefer, however, to make the hinged members in sections, or short lengths, for instance six feet in length, the end of one section overlapping the end of an adjacent section, and so on. When so constructed only those sections upon which the trolley wheel is passing will present an open slot, while other sections along the line will remain closed.

The operation will be readily perceived. As the car advances the advance conduit opening wheels n n, exerting a downward pressure upon the rails upon which they travel, will cause a separation of the overlapping ends of the hinged members before such point is reached by the trolley wheel support, the rearward conduit opening wheels serving to maintain the conduit open for a distance to the rear of said support. When the conduit is constructed in sections, the advance wheels separate the hinged members of the section before the trolley-wheel support reaches the section, and the rearward wheels maintain the members of the section open until after the trolley support has passed to the next section. Since the end of each section extends beneath the end of one of the adjacent sections, when the ends of the sections are made overlapping, the members of such adjacent section will be separated at one end before the advance conduit opening wheels have reached the section, as shown in Fig. 5, and the hinged members should preferably be made sufficiently flexible when so constructed to permit opening at one end while remaining closed at the other end.

The advantages arising from this construction are readily apparent. Except when a car is passing the interior conduit remains closed, thus protecting the trolley wire from foreign substances, and being located within the large conduit does not present the objections accompanying a slot at the surface of the street adapted to be opened and closed. Any foreign substances, as water and the like, entering the exterior conduit through the slot b, do not enter the trolley or interior conduit, but striking the oblique walls thereof pass to the side, and if water, may be led off by the drains at the side. The hinged members may be so mounted upon their pivots that no water may pass into the interior conduit, and such water as gains access to the interior conduit by any means, as for instance through the open slot while a car is passing, may be readily led off by proper drains with check valves.

It is evident that my invention is capable of many embodiments and changes in matters of detail, and I do not, therefore desire to limit myself to precise constructions, but

What I claim, and desire to secure by Letters Patent, is—

1. The combination with an exterior conduit provided with a slot opening upon the road bed, of an interior conduit inclosing the trolley conductor and comprised by hinged members normally closed together at their edges, and traveling wheels carried upon the car adapted to move within said exterior conduit but without said interior conduit to separate said hinged members to permit the passage of the trolley support, substantially as described.

2. The combination with a trolley wire, of a normally closed conduit inclosing the same, said conduit comprising a pair of hinged members with their edges normally closed together, and traveling wheels supported on the car, and adapted to move on the exterior of said conduit, for engaging said hinged members to separate the same and permit the passage of the trolley support, substantially as described.

3. The combination with a trolley, of a normally closed conduit inclosing the same, said conduit comprising a pair of hinged members overlapping at their ends, and traveling wheels carried upon the car adapted to engage said hinged members at points located upon the opposite side of the pivotal axes from said overlapping ends to open said conduit for the passage of the trolley support, substantially as described.

4. The combination with the trolley wire, of the conduit inclosing the same, and comprising the hinged members e e made in sections, the trolley wheel adapted to engage said trolley wire, and conduit opening wheels carried by the car and located, one pair in advance of, and another to the rear of the trolley wheel, substantially as described.

In witness whereof I hereunto subscribe my name this 23d day of December, A. D. 1893.

PATRICK ×his mark MURPHY.

Witnesses:
W. CLYDE JONES,
CHARLES A. BROWN.